United States Patent
Wang et al.

(10) Patent No.: US 8,331,326 B2
(45) Date of Patent: Dec. 11, 2012

(54) METHOD AND APPARATUS FOR PERFORMING A HANDOVER IN AN EVOLVED UNIVERSAL TERRESTRIAL RADIO ACCESS NETWORK

(75) Inventors: Peter S. Wang, East Setauket, NY (US); Guodong Zhang, Syosset, NY (US); Jin Wang, Central Islip, NY (US); Mohammed Sammour, Alrabieh (JO); Shankar Somasundaram, Deer Park, NY (US); Stephen E. Terry, Northport, NY (US); Ulises Olvera-Hernandez, Kirkland (CA)

(73) Assignee: InterDigital Patent Holdings, Inc., Wilmington, DE (US)

( * ) Notice: Subject to any disclaimer, the term of this patent is extended or adjusted under 35 U.S.C. 154(b) by 524 days.

(21) Appl. No.: 12/492,469

(22) Filed: Jun. 26, 2009

(65) Prior Publication Data

US 2010/0254351 A1    Oct. 7, 2010

Related U.S. Application Data

(60) Provisional application No. 61/076,943, filed on Jun. 30, 2008.

(51) Int. Cl.
*H04W 4/00* (2009.01)
*H04L 12/26* (2006.01)

(52) U.S. Cl. .................... 370/332; 370/252

(58) Field of Classification Search .......... 370/310–350, 370/436–437, 439, 442
See application file for complete search history.

(56) References Cited

U.S. PATENT DOCUMENTS

| 5,872,774 | A | 2/1999 | Wheatley, III et al. |
| 7,003,303 | B2 | 2/2006 | Khawand et al. |
| 7,525,941 | B2 | 4/2009 | Islam et al. |
| 7,852,805 | B2 | 12/2010 | Kahtava et al. |
| 2004/0082356 | A1 | 4/2004 | Walton et al. |

(Continued)

FOREIGN PATENT DOCUMENTS

EP    0568212 B1    9/1997

(Continued)

OTHER PUBLICATIONS

Third Generation Partnership Project, "Technical Specification Group Radio Access Network; Evolved Universal Terrestrial Radio Access (E-UTRA) and Evolved Universal Terrestrial Radio Access Network (E-UTRAN) (Release 8)," 3GPP TS 36.300 V8.5.0 (May 2008).

Third Generation Partnership Project, "Technical Specification Group Radio Access Network; Evolved Universal Terrestrial Radio Access (E-UTRA) and Evolved Universal Terrestrial Radio Access Network (E-UTRAN) (Release 8)," 3GPP TS 36.300 V8.8.0 (Mar. 2009).

(Continued)

*Primary Examiner* — Warner Wong
(74) *Attorney, Agent, or Firm* — Condo Roccia LLP

(57) ABSTRACT

A method and an apparatus for performing a handover in an evolved universal terrestrial radio access network (E-UTRAN) are disclosed. A wireless transmit/receive unit (WTRU) sends a measurement report to a source evolved Node B (eNB), and receives a handover command from the source eNB. The WTRU initiates reception and processing of a primary broadcast channel (P-BCH) at the target cell after receiving the handover command. The WTRU then sends a random access preamble to the target eNB, receives a random access response from the target eNB, and sends a handover complete message to the target eNB. The reception and processing of the P-BCH may be initiated immediately after receiving the handover command or after sending the handover complete message. The WTRU may apply default configuration or source cell configuration in the target cell until a target cell SFN and/or P-BCH information are acquired.

20 Claims, 5 Drawing Sheets

U.S. PATENT DOCUMENTS

| | | | |
|---|---|---|---|
| 2007/0047493 A1 | 3/2007 | Park et al. | |
| 2008/0254800 A1 | 10/2008 | Chun et al. | |
| 2008/0267131 A1* | 10/2008 | Kangude et al. | 370/331 |
| 2009/0086676 A1* | 4/2009 | Meylan et al. | 370/331 |
| 2009/0129335 A1 | 5/2009 | Lee et al. | |
| 2009/0168728 A1* | 7/2009 | Pani et al. | 370/332 |
| 2009/0238141 A1* | 9/2009 | Damnjanovic et al. | 370/331 |
| 2009/0239539 A1* | 9/2009 | Zhang et al. | 455/436 |
| 2009/0247161 A1* | 10/2009 | Pani et al. | 455/435.3 |
| 2009/0274086 A1* | 11/2009 | Petrovic et al. | 370/312 |
| 2010/0027466 A1* | 2/2010 | Mustapha | 370/328 |
| 2010/0182974 A1* | 7/2010 | Barraclough et al. | 370/329 |
| 2010/0202402 A1* | 8/2010 | Dalsgaard et al. | 370/331 |
| 2010/0210255 A1* | 8/2010 | Amirijoo et al. | 455/419 |

FOREIGN PATENT DOCUMENTS

| | | |
|---|---|---|
| EP | 1058471 | 12/2000 |
| EP | 1117269 | 7/2001 |
| EP | 1199904 | 4/2002 |
| EP | 1799003 A1 | 6/2007 |
| EP | 1 909 523 | 4/2008 |
| JP | 2006-504335 A | 2/2006 |
| JP | 2009-519636 A | 6/2007 |
| RU | 2003122285 | 2/2005 |
| WO | WO 01/72081 A1 | 9/2001 |
| WO | WO 03043237 | 5/2003 |
| WO | WO 2005122704 | 12/2005 |
| WO | WO 2007/066882 A1 | 6/2007 |
| WO | WO 2007/144760 A2 | 12/2007 |
| WO | WO 2008/023927 A2 | 2/2008 |
| WO | WO 2008/040447 A1 | 4/2008 |

OTHER PUBLICATIONS

Third Generation Partnership Project, "Technical Specification Group Radio Access Network; Evolved Universal Terrestrial Radio Access (E-UTRA) and Evolved Universal Terrestrial Radio Access Network (E-UTRAN) (Release 8)," 3GPP TS 36.300 V8.9.0 (Jun. 2009).

Third Generation Partnership Project, "Technical Specification Group Radio Access Network; Evolved Universal Terrestrial Radio Access (E-UTRA) and Evolved Universal Terrestrial Radio Access Network (E-UTRAN) (Release 9)," 3GPP TS 36.300 V9.0.0 (Jun. 2009).

Third Generation Partnership Project, "Technical Specification Group Radio Access Network; Evolved Universal Terrestrial Radio Access (E-UTRA) Radio Resource Control (RRC) (Release 8)," 3GPP TS 36.331 V8.2.0 (May 2008).

Third Generation Partnership Project, "Technical Specification Group Radio Access Network; Evolved Universal Terrestrial Radio Access (E-UTRA) Radio Resource Control (RRC) (Release 8)," 3GPP TS 36.331 V8.5.0 (Mar. 2009).

Third Generation Partnership Project, "Technical Specification Group Radio Access Network; Evolved Universal Terrestrial Radio Access (E-UTRA) Radio Resource Control (RRC) (Release 8)," 3GPP TS 36.331 V8.6.0 (Jun. 2009).

Change Request for 3GPP TS 36.331 V8.1.0 (Mar. 2008), 3GPP TSG-RAN2 Meeting #62, R2-082903, (Kansas City, U.S.A., May 5-9, 2008).

LG Electronics, "Need to obtain the target SFN prior to HO," 3GPP TSG-RAN#59bis WG 2 LTE, R2-074312 (Oct. 8-12, 2007).

Panasonic, "SIB reading after handover," 3GPP TSG RAN WG2 RRC Ad Hoc, R2- 082948 (Jun. 2008).

RAN WG2, "LS on LTE latency analysis," 3GPP TSG RAN WG1 Meeting #49bis, R1-072648 (Jun. 25-29, 2007).

Third Generation Partnership Project, "Technical Specification Group Radio Access Network; Evolved Universal Terrestrial Radio Access (E-UTRA) and Evolved Universal Terrestrial Radio Access (E-UTRAN) (Release 8)," 3GPP TS 36.300 V8.8.0 (Mar. 2009).

Third Generation Partnership Project, "Technical Specification Group Radio Access Network; Evolved Universal Terrestrial Radio Access (E-UTRA) and Evolved Universal Terrestrial Radio Access Network (E-UTRAN) (Release 8)," 3GPP TS 36.300 V8.4.0 (Mar. 2008).

Samsung, "Handover Procedure for L TE-Active UEs", 3GPP TSG-RAN WG2 #50 Meeting, R2-060078, (Sophia-Antipolis, France, Jan. 9-13, 2006), 6 pages.

Third Generation Partnership Project, "Technical Specification Group Radio Access Network; Feasibility Study for Evolved UTRA and UTRAN (Release 7)", 3GPP TR 25.912 V0.1.7 (Jun. 2006), 64 pages.

Third Generation Partnership Project, "Technical Specification Group Radio Access Network; Feasibility Study for Evolved UTRA and UTRAN (Release 7)", 3GPP TR 25.912 V0.2.0 (Jun. 2006), 57 pages.

Third Generation Partnership Project, "Technical Specification Group Radio Access Network; Feasibility Study For Evolved Universal Terrestrial Radio Access (UTRA) and Universal Terrestrial Radio Access Network (UTRAN) (Release 7)", 3GPP TR 25.912 V7.1.0 (Sep. 2006), 56 pages.

Third Generation Partnership Project, "Technical Specification Group Radio Access Network; Feasibility Study for Evolved UTRA and UTRAN (Release 7)", 3GPP TR 25.912 V0.1.4 (May 2006), 40 pages.

3rd Generation Partnership Project (3GPP), R2-061199, "Discussion One Node B Change Procedure", Qualcomm Europe, 3GPP TSG-RAN WG2 Meeting #53, Shanahai, China, May 8-12, 2006, 7 pages.

3rd Generation Partnership Project (3GPP), TS 36.300, V8.0.0, "3rd Generation Partnership Project: Technical Specification Group Radio Access Network; Evolved Universal Terrestrial Radio Access (E-UTRA) And Evolved Universal Terrestrial Radio Access network (E-UTRAN); Overall Description; Stage 2 (Release 8)", Mar. 2007, 82 pages.

Koodli, et al., "A Context Transfer Protocol for Seamless Mobility", Draft-koodli-seamoby-ct-04 txt, Seamoby Working Group, Internet Draft, Aug. 30, 2002, 35 pages.

3rd Generation Partnership Project (3GPP), R2-061928, "RRC Re-establishment Procedure", NTT DoCoMo, 3GPP TSG-RAN WG2 Ad-hoc on LTE, R2-061928, Cannes, France, Jun. 27-30, 2006, 6 pages.

3rd Generation Partnership Project (3GPP), R2-060095, "Real-time services handover support within E-UTRAN," Huawei, 3GPP TSG-RAN WG2 Meeting #50, R2-060095, Sophia-Antipolis, France, Jan. 9-13, 2006, 4 pages.

3rd Generation Partnership Project (3GPP), R1-060773, "Text Proposal of Prioritizing Non-synchronized Random Access in E-UTRA uplink," ITRI, 3GPP TSG-RAN WG 1 Meeting #44bis, R1-060773, Athens, Greece, Mar. 27-31, 2006, 6 pages.

3rd Generation Partnership Project (3GPP), R2-061135, "Intra-LTE Handover operation," Nokia, NTT DoCoMo, 3GPP TSG-RAN WG2 Meeting #53, R2-061135, Shanghai, PRC, May 8-13, 2006, 3 pages.

3rd Generation Partnership Project (3GPP), R3-060009, "The Handover Procedure for the LTE_ACTIVE Mobility," Panasonic, 3GPP TSG-RAN WG3 Meeting #50, R3-060009, Sophia Antipolis, France, Jan. 10-12, 2006, 4 pages.

Third Generation Partnership Project, "Technical Specification Group Radio Access Network; Evolved Universal Terrestrial Radio Access (E-UTRA) Radio Resource Control (RRC); Protocol Specification (Release 8)", 3GPP TS 36.331 V8.1.0 (Mar. 2008), 122 pages.

Third Generation Partnership Project, "Technical Specification Group Radio Access Network; Evolved Universal Terrestrial Radio Access (E-UTRA) Radio Resource Control (RRC); Protocol Specification (Release 8)", 3GPP TS 36.331 V8.4.0 (Dec. 2008), 198 pages.

Samsung, "Neighbouring cell information," 3GPP TSG-RAN WG2 Meeting #56bis, R2-070167 (Jan. 15-19, 2007), 3 pages.

Qualcomm Europe, "Delivery of HO Command," 3GPP TSG-RAN WG 2 meeting #59-bis, R2-073992 (Oct. 8-12, 2007), 3 pages.

IPwireless, "Contention-free Intra-LTE handover," 3GPP TSG RAN WG2 #57, R2-070646 (Feb. 12-16, 2007), 4 pages.

European Telecommunications Standards Institute (ETSI), TS 136 300 V8.4.0, "Evolved Universal Terrestrial Radio Access (E-UTRA) And Evolved Universal Terrestrial Radio Access network (E-UTRAN); Overall Description; Stage 2 (3GPP TS 36.300 Version 8.4.0 Release 8)", Apr. 2008, 5 pages.

* cited by examiner

METHOD AND APPARATUS FOR PERFORMING A HANDOVER IN AN EVOLVED UNIVERSAL TERRESTRIAL RADIO ACCESS NETWORK

CROSS REFERENCE TO RELATED APPLICATIONS

This application claims the benefit of U.S. provisional application No. 61/076,943 filed Jun. 30, 2008, which is incorporated by reference as if fully set forth.

FIELD OF INVENTION

This application is related to wireless communications.

BACKGROUND

A handover is a process of transferring an ongoing call or data session from one cell to another. Conventionally, a wireless transmit/receive unit (WTRU) assisted network controlled handover is implemented such that a WTRU measures a signal strength of neighboring cells and a serving cell and sends a measurement report to the network. The network then determines whether to perform the handover to another cell, (i.e., a target cell).

FIG. 1 is a signaling diagram of a handover process 100 in the third generation partnership project (3GPP) long term evolution (LTE) network (intra-mobility management entity (MME)/serving gateway handover procedure). The source evolved Node-B (eNB) configures the WTRU measurement procedures according to the area restriction information (step 102). The WTRU sends a measurement report in accordance with the rules set by system information, specification, etc. (step 104). The source eNB makes a handover decision based on the measurement report (step 106). The source eNB issues a handover request message to a target eNB passing necessary information to prepare the handover at the target eNB (step 108). Admission control may be performed by the target eNB (step 110). Once the target eNB decides to admit the WTRU, the target eNB prepares handover with L1/L2 and sends a handover request acknowledgement message to the source eNB (step 112). The handover request acknowledgement message includes a transparent container to be sent to the WTRU as a radio resource control (RRC) message. The source eNB sends a handover command to the WTRU (step 114).

Upon receipt of the handover command, the WTRU detaches from the source cell and synchronizes to the target cell and accesses the target cell via an RACH following a contention-free procedure if a dedicated RACH preamble was indicated in the handover command or following a contention-based RACH procedure if no dedicated RACH preamble was indicated in the handover command (step 116). The target eNB sends a random access response with uplink allocation and timing advance value for the WTRU (step 118). The WTRU then sends a handover complete message to the target eNB (step 120). A normal operation starts between the WTRU and the target eNB thereafter.

A WTRU needs to know a system frame number (SFN) after handover for its normal operation in the target cell. Especially, both discontinuous reception (DRX) and reception of dynamic broadcast channel (D-BCH) require the WTRU to have the knowledge of SFN. Therefore, an efficient method would be desirable to handle SFN during and after handover.

SUMMARY

A method and an apparatus for performing a handover in an evolved universal terrestrial radio access network (E-UTRAN) are disclosed. A WTRU sends a measurement report to a source eNB, and receives a handover command from the source eNB. The WTRU initiates reception and processing of a primary broadcast channel (P-BCH) at the target cell after receiving the handover command. The WTRU then sends a random access preamble to the target eNB, receives a random access response from the target eNB, and sends a handover complete message to the target eNB. The reception and processing of the P-BCH may be initiated immediately after receiving the handover command or after sending the handover complete message. The WTRU may initiate a radio link recovery procedure on a condition that a target cell system frame number (SFN) is not acquired after a pre-determined period of time. The WTRU may apply default configuration or source cell configuration in the target cell until a target cell SFN and/or P-BCH information are acquired.

BRIEF DESCRIPTION OF THE DRAWINGS

A more detailed understanding may be had from the following description, given by way of example in conjunction with the accompanying drawings wherein.

DETAILED DESCRIPTION

Figure 1:
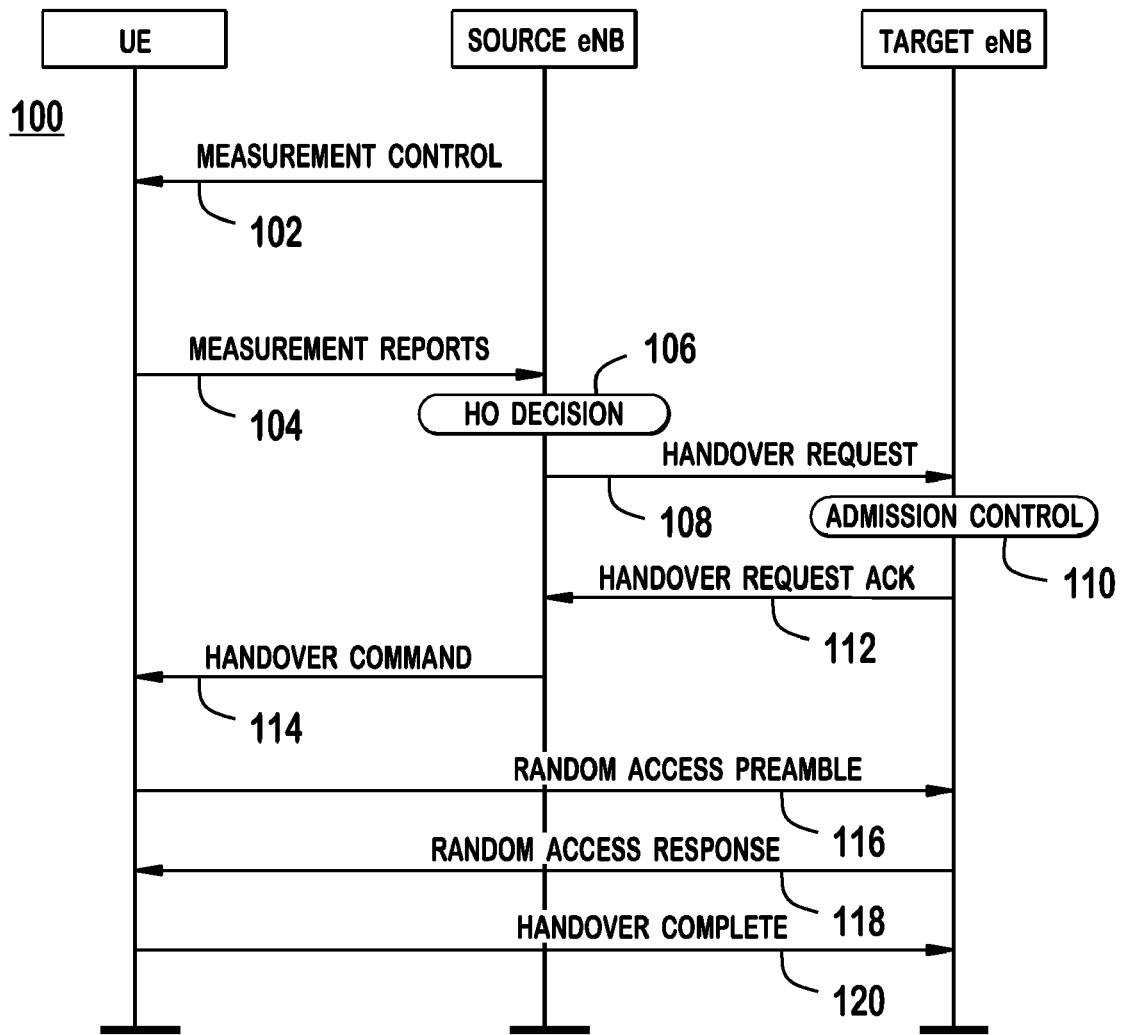
FIG. 1 is a signaling diagram of a handover process in the 3GPP LTE network.

When referred to hereafter, the terminology "WTRU" includes but is not limited to a user equipment (UE), a mobile station, a fixed or mobile subscriber unit, a pager, a cellular telephone, a personal digital assistant (PDA), a computer, or any other type of user device capable of operating in a wireless environment. When referred to hereafter, the terminology "eNB" includes but is not limited to a base station, a Node-B, a site controller, an access point (AP), or any other type of interfacing device capable of operating in a wireless environment.

In accordance with a first embodiment, a new handover command format is defined. The new handover command format reduces the handover interruption time, which is defined as the difference between the time a WTRU receives the handover command and the time the WTRU resumes its uplink and downlink data transmission and reception in the target cell.

In order for the WTRU to perform normal operation (such as data transmission, reception and DRX) in the target cell, the WTRU needs to know cell-specific system information carried on a P-BCH and a D-BCH. However, reading P-BCH (with a transmission time interval (TTI) of 40 ms repeated 4 times) and D-BCH (with scheduling units of 160 and 320 ms) will increase the handover interruption time dramatically. In accordance with the first embodiment, the cell specific system information carried on the P-BCH and the D-BCH in the target cell is included in the handover command. This information may be provided by the target eNB to the source eNB in the handover request acknowledgement message, (e.g., included in the transparent container of the handover request acknowledgement).

The cell-specific system information included in the handover command may be at least one of the following:

(1) Downlink system bandwidth;
(2) Physical control format indicator channel (PCFICH) information;
(3) Physical HARQ indicator channel (PHICH) information, (e.g., PHICH duration and PHICH resource size);
(4) Signaling of reference signal transmit power and power scaling of the reference signal to other data/control sub-carriers;
(5) RACH configuration: Information of dedicated preamble reserved for the WTRU in the target cell (validity timer of the dedicated preamble is provided for both synchronous and asynchronous networks) and contention-based RACH information (optional);
(6) Information for uplink reference signals (frequency hopping);
(7) Information for sounding reference signals (location);
(8) Physical uplink control channel (PUCCH) reference signal sequence hopping (same for positive acknowledgement (ACK)/negative acknowledgement (NAK) and/or channel quality indicator (CQI));
(9) Physical uplink shared channel (PUSCH) hopping: semi-static configuration of two hopping modes (inter and intra-sub-frame or inter-sub-frame only hopping) on a cell specific basis;
(10) Uplink power control (cell specific) parameters;
(11) DRX related parameters in the target cell (optional);
(12) Start time of new DRX cycle in the target cell (optional);
(13) System frame number (optional): either full SFN of the target cell or an SFN difference between the source and target cells;
(14) Number of transmit antennas at the target eNB (optional since this may be blindly detected by the WTRU during cell search);
(15) Multimedia broadcast multicast service single frequency network (MBSFN)-related parameters (optional);
(16) Neighboring cells list (optional);
(17) Configuration information for semi-persistent scheduling (SPS) in the target cell;
(18) Uplink and/or downlink persistent scheduling parameters (optional); and
(19) Uplink ACK/NACK resource due to downlink persistent scheduling (optional).

Alternatively, the above cell-specific information, (i.e., handover parameters), may be defined with one or more set of "default" values, and the target eNB may determine which one of the pre-defined sets of values may be used by the WTRU and send only the index to the determined set of default values for a very compact signalling.

Alternatively, a special system information block (SIB) format may be provided for predefined handover parameter values (parameters as defined above) with the scope of one or more public land mobile network (PLMN) (similar to the multiple PLMNs contained in the master information block (MIB) or other SIBs as for the network sharing purpose or just to a particular PLMN), such that the network/service provider, (i.e., the PLMN owner), may predefine the necessary handover values (one or more sets) for the WTRU to acquire before the handover. The eNBs may broadcast such an SIB. The handover command may then pass only the index to the WTRU for the handover parameters to the target eNB.

The WTRU may indicate or report its acquisition of handover parameters from the SIB to the network in one of its uplink messages (such as an RRC reconfiguration complete message or an RRC measurement report message, etc). One bit is enough for this purpose.

The network may decide which way the handover parameter values will be sent to the WTRU in the handover command, either a complete new set of values, an index to the default value set, or an index to a set of the predefined value sets in the SIB broadcast by the eNB.

Figure 2:
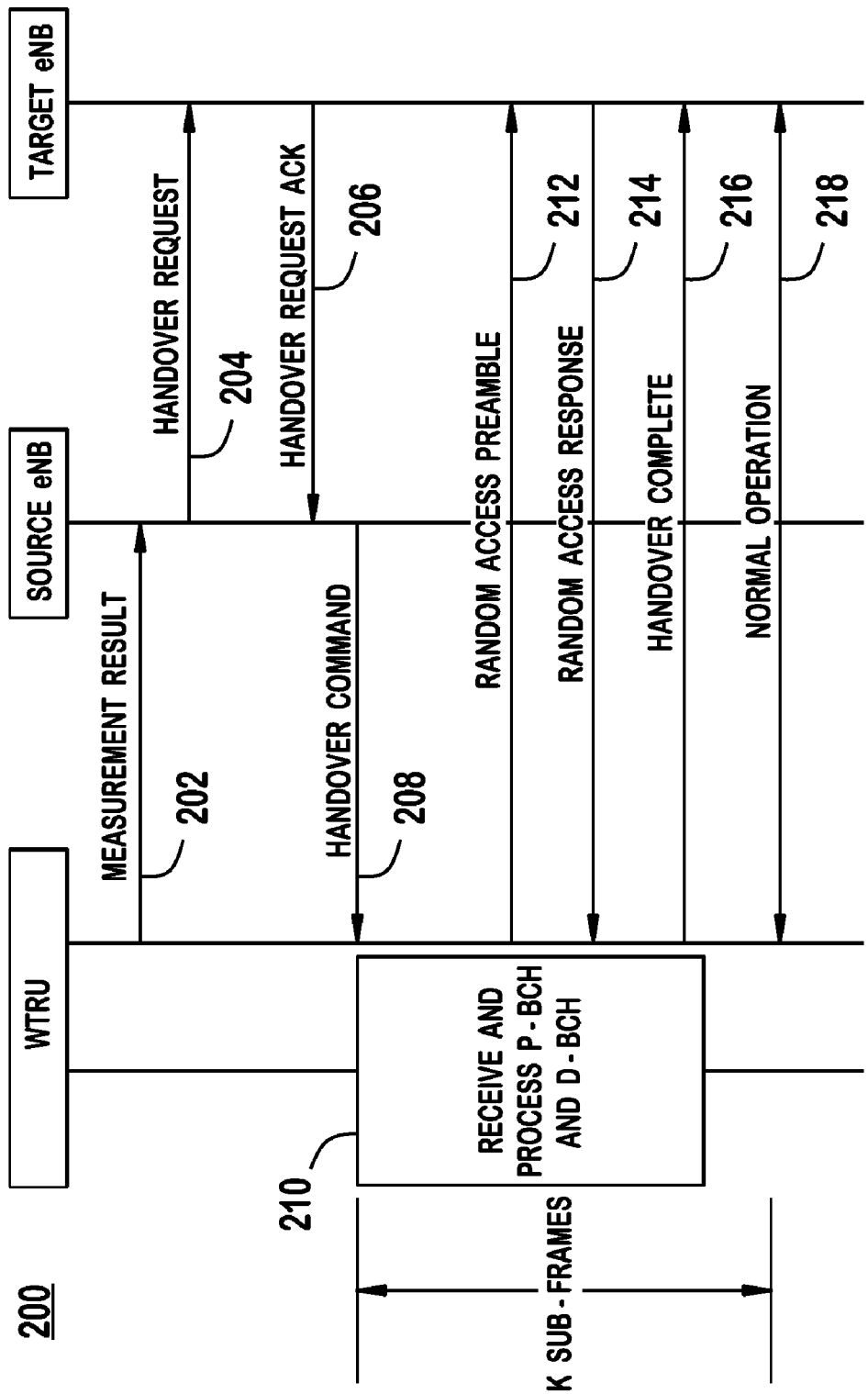
FIG. 2 is a signaling diagram of an example process in accordance with the second embodiment.

In accordance with a second embodiment, a WTRU immediately starts receiving and processing the P-BCH and the D-BCH after receiving the handover command (without SFN information) from the source eNB. FIG. 2 is a signaling diagram of an example process 200 in accordance with the second embodiment. The WTRU sends a measurement report in accordance with the rules set by system information, specification, etc. (step 202). The source eNB makes a handover decision based on the measurement report and issues a handover request message to the target eNB passing necessary information to prepare the handover at the target eNB (step 204). The target eNB decides to admit the WTRU and sends a handover request acknowledgement message to the source eNB (step 206). The handover request acknowledgement message includes a transparent container to be sent to the WTRU as an RRC message. The source eNB sends a handover command to the WTRU (step 208).

After receiving the handover command (without SFN information) from the source eNB, the WTRU immediately starts receiving and processing the P-BCH and the D-BCH (step 210). The WTRU synchronizes to the target cell and sends a random access preamble following a contention-free procedure if a dedicated RACH preamble was indicated in the handover command or following a contention-based RACH procedure if no dedicated RACH preamble was indicated in the handover command (step 212). The reception of P-BCH and D-BCH may start before the WTRU may transmit the RACH access preamble since the WTRU may need to wait for a random access opportunity (1 sub-frame out of 10 or 20 sub-frames). Since the physical resources of the P-BCH and the D-BCH are different than those of eNB message, (i.e., RACH response), during RACH procedure, the WTRU may receive and process both without any problem. The target eNB sends a random access response to the WTRU (step 214). The WTRU then sends a handover complete message to the target eNB (step 216). A normal operation starts between the WTRU and the target eNB thereafter (step 218).

The target eNB may assume that the WTRU already acquired the target cell SFN, P-BCH and D-BCH K sub-frames after the WTRU receives the handover command, and start normal operations for the WTRU. The period of time to acquire the target cell SFN may be less than the P-BCH and D-BCH information. Before that, the normal operations may not be started by the target eNB for the WTRU. These normal operations include, but are not limited to, DRX cycle, L1 feedback, dynamic and semi-persistent data transmission and reception, timing alignment, RACH process, or the like.

The WTRU may provide implicit or explicit signaling to inform the target eNB of when the target cell SFN and/or BCH information is acquired. Alternatively, if the WTRU fails to receive target cell SFN and P-BCH and detect P-BCH timing successfully after K sub-frames, the WTRU may treat it as radio link failure and start radio link recovery procedure.

A default mode of operation may be applied in the target cell until the WTRU acquires target cell SFN and/or BCH information after sending the handover complete message. Generally, the functions, (e.g., DRX), that are affected by not having the target cell SFN and/or other system information on the target cell at the time of handover may be disabled until the target cell information is acquired and applied, or alternatively, may operate as it would have in the source cell and then switch when the target cell information is acquired and applied. For example, DRX operation may be disabled, and L1 feedback may not be generated or may be ignored.

Figure 3:
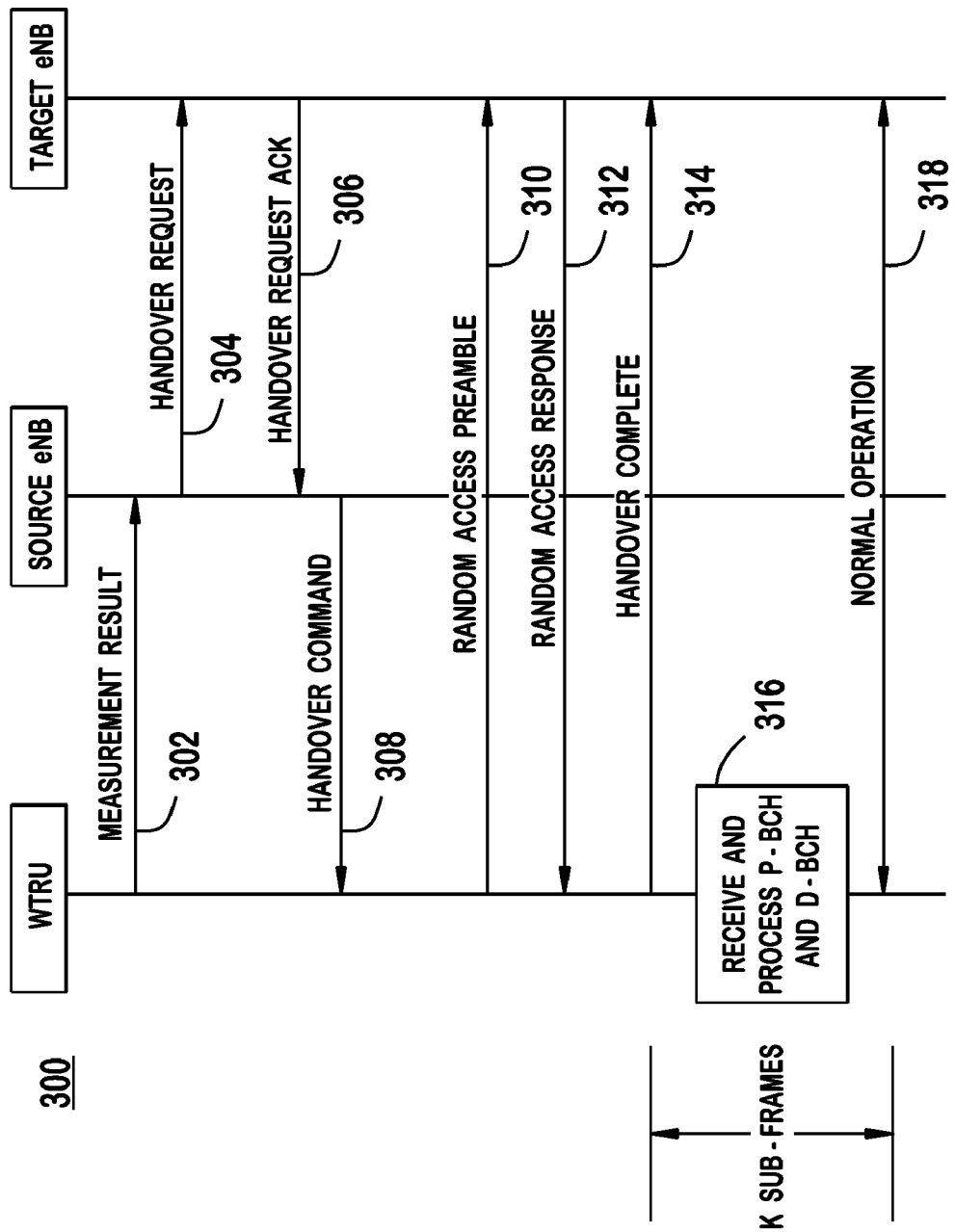
FIG. 3 is a signaling diagram of an example process in accordance with an alternative to the second embodiment.

FIG. 3 is a signaling diagram of an example process 300 in accordance with an alternative to the second embodiment. The WTRU sends a measurement report in accordance with the rules set by system information, specification, etc. (step 302). The source eNB makes a handover decision based on the measurement report and issues a handover request message to the target eNB passing necessary information to prepare the handover at the target eNB (step 304). The target eNB decides to admit the WTRU and sends a handover request acknowledgement message to the source eNB (step 306). The handover request acknowledgement message includes a transparent container to be sent to the WTRU as an RRC message. The source eNB sends a handover command to the WTRU (step 308).

Upon receipt of the handover command, the WTRU detaches from the source cell and synchronizes to the target cell and sends a RACH access preamble to the target eNB following a contention-free procedure if a dedicated RACH preamble was indicated in the handover command or following a contention-based RACH procedure if no dedicated preamble was indicated in the handover command (step 310). The target eNB sends a random access response with uplink allocation and timing advance value for the WTRU (step 312). The WTRU then sends a handover complete message to the target eNB (step 314). After sending the handover complete command to the target eNB, the WTRU may immediately start receiving and processing the P-BCH and the D-BCH on the target cell (step 316). After K sub-frames from the handover complete message, a normal operation may start between the WTRU and the target eNB (step 318).

A default mode of operation may be applied in the target cell until the WTRU acquires target cell SFN and/or BCH information after sending the handover complete message. Generally, the functions, (e.g., DRX), that are affected by not having the target cell SFN and/or other system information on the target cell at the time of handover may be disabled until the target cell information is acquired and applied, or alternatively, may operate as it would have in the source cell and then switch when the target cell information is acquired and applied. For example, DRX operation may be disabled, and L1 feedback may not be generated or may be ignored.

If the DRX related parameters are provided only in the SIB in the target cell, the WTRU may use the DRX parameters from the source cell and continue with DRX operation until the WTRU reads the SFN on the target cell. Alternatively, the WTRU may not apply DRX until the WTRU reads DRX parameters from the system information on the target cell.

If there is no new SFN value when a WTRU enters the target cell, the target eNB may reconfigure the SPS parameters, such as periodicities, HARQ process or radio resources. Alternatively, since an MIB may be received within 16 ms and the interruption may be short, SPS may be disabled until the WTRU gets the SFN information on the target cell.

The WTRU may keep the configuration for DRX and SPS as used in the source cell. The source eNB scheduler may make an implicit or explicit indication of when the WTRU switches to the new configuration to the target eNB. The source eNB may inform the target eNB of the DRX/SPS activity patterns that will be in effect. The target eNB may reject the source cell DRX/SPS activity patterns and have the WTRU de-activate until the target cell system information is acquired.

In accordance with a third embodiment, a WTRU may discard or ignore the source cell configuration, (e.g., SPS and/or DRX configuration such as SPS semiPersistSchedInterval, DRX cycles, etc), upon a medium access control (MAC) reset due to handover. Upon reception of the handover command from the source eNB, the WTRU performs a MAC reset and may discard or ignore the source cell configuration.

Alternatively, the WTRU may keep and continue with the source cell configurations. The WTRU MAC entity may preserve the source cell configuration during the MAC reset. Alternatively, the WTRU MAC entity discards the source cell configuration due to the MAC reset, but the WTRU RRC entity may preserve the source cell configuration and reconfigure the MAC entity with the source cell configuration following the handover, (e.g., once or after the MAC reset procedure is completed).

The operations in the target cell, (e.g., SPS and/or DRX operations), may be activated by eNB signaling to the WTRU in the source cell, by eNB signaling to the WTRU in the target cell, or in accordance with a pre-defined rule.

Figure 4:
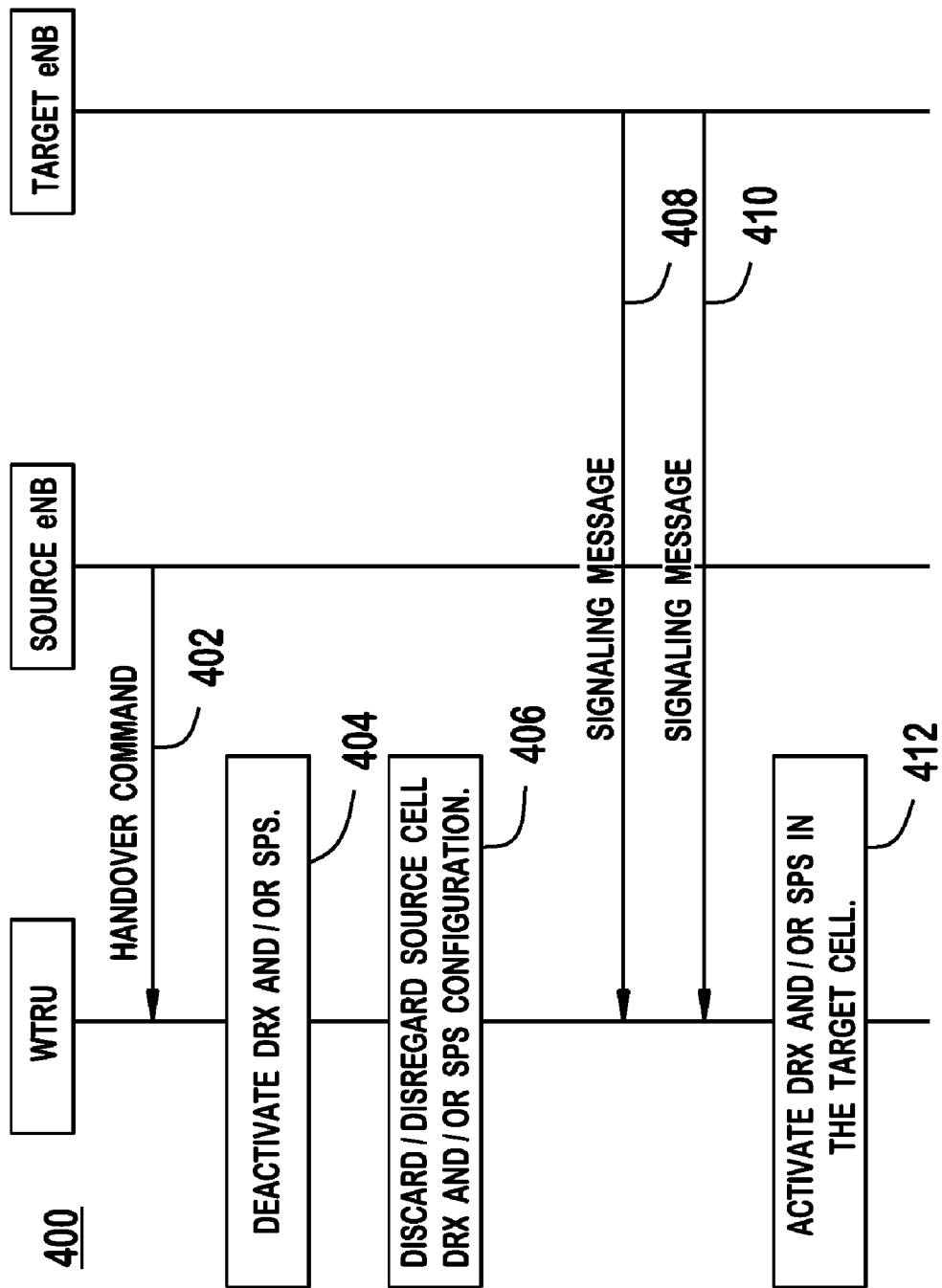
FIG. 4 is a flow diagram of an example process for performing a medium access control (MAC) reset and activating DRX and/or semi-persistent scheduling (SPS) in the target cell in accordance with the third embodiment.

FIG. 4 is a flow diagram of an example process 400 for performing a MAC reset and activating DRX and/or SPS in the target cell in accordance with the third embodiment. A WTRU receives a handover command from the source eNB and performs a MAC reset (step 402). The WTRU deactivates DRX and/or SPS upon or due to MAC reset or during the execution of the handover procedure (step 404). The WTRU discards or disregards the source cell DRX and/or SPS configurations upon or due to MAC reset (step 406). The WTRU receives a first signaling message, (e.g., an RRC message, or any L2 or L3 message), indicating the target cell DRX and/or SPS configurations directly from the target eNB in the target cell (step 408). The target eNB was made aware of the source cell DRX and/or SPS configurations for the WTRU via a signaling message sent from the source eNB to the target eNB, (e.g., in the handover request message or a subsequent message). The WTRU receives a second signaling message, (e.g., a PDCCH signal, an RRC message, or any L2 or L3 message), indicating activation of DRX and/or SPS, or when to activate DRX and/or SPS, directly from the target eNB in the target cell (step 410). The first and the second signaling messages may be sent simultaneously or separately, or may be combined in one message. The WTRU then activates DRX and/or SPS in the target cell in accordance with the target cell configuration and activation information (step 412).

The target cell DRX and/or SPS configuration provided in the first signaling message may be interpreted in a following way. The absence of a DRX and/or SPS configuration IE in the first signaling message is interpreted by the WTRU as an indication to preserve and continue with the existing DRX and/or SPS configurations. The presence of a DRX and/or SPS configuration IE in the first signaling message is interpreted by the WTRU to reconfigure its DRX and/or SPS configurations in accordance with the configuration included in the first signaling message. An indication bit may be included in the first signaling message to indicate to the WTRU whether the WTRU should preserve and continue with the existing DRX and/or SPS configurations or disregard the existing configuration.

Instead of receiving the target cell DRX and/or SPS configurations via the first signaling message from the target eNB, the target cell DRX and/or SPS configurations may be received via the handover command. In the handover command's transparent container sent from the target eNB to the source eNB, the target eNB indicates the DRX and/or SPS configurations. The target eNB was made aware of the source eNB DRX and/or SPS configurations via a signaling message sent from the source eNB to the target eNB, (e.g., in the handover request message or in a subsequent message). The absence of a DRX and/or SPS configuration IE in the handover command is interpreted by the WTRU as an indication to preserve and continue with the existing DRX and/or SPS configurations and the presence of the DRX and/or SPS configuration IE in the handover command is interpreted by the WTRU to reconfigure its DRX and/or SPS configurations in accordance with the included configuration parameters. An indication bit may be included in the handover command to indicate to the WTRU whether the WTRU should preserve and continue with the existing DRX and/or SPS configurations, or disregard the existing configuration.

The WTRU may decide when to activate DRX and/or SPS, (e.g., at or after a specific time or SFN), based on a pre-defined criteria, instead of the second signaling message from the target eNB.

It should be noted that the example process described in FIG. 4 mention both DRX and SPS together (in order to avoid text repetition), but it may be applied separately to the DRX independent of SPS, to the uplink SPS independent of DRX and downlink SPS, to downlink SPS independent of DRX or uplink SPS, or to any other functions.

Figure 5:
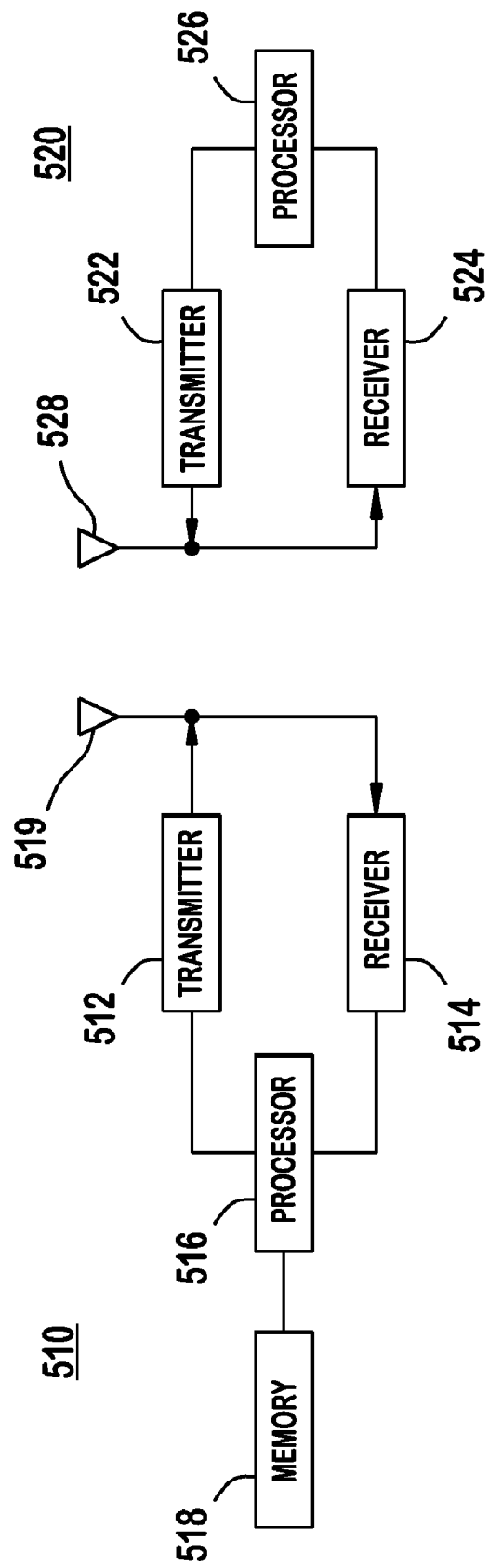
FIG. 5 is a block diagram of an example WTRU and an example eNB.

FIG. 5 is a block diagram of an example WTRU 510 and an eNB 520. The WTRU 510 is in communication with the eNB 520 and both are configured to perform a method of performing a handover in an E-UTRAN. In addition to the components that may be found in a typical WTRU, the WTRU 510 includes a transmitter 512, a receiver 514, and a processor 516, a memory 518 and an antenna 519. The memory 518 is provided to store software including operating system, application, etc. The processor 516 is provided to perform, alone or in association with the software, a method of performing a handover in accordance with one of the embodiments disclosed above. The transmitter 512 and the receiver 514 are in communication with the processor 516. The antenna 519 is in communication with both the transmitter 512 and the receiver 514 to facilitate the transmission and reception of wireless data.

In addition to the components that may be found in a typical eNB, the eNB 520 includes a transmitter 522, a receiver 524, a processor 526, and an antenna 528. The processor 526 is provided to perform a method of performing a handover in accordance with one of the embodiments disclosed above. The transmitter 522 and the receiver 524 are in communication with the processor 526. The antenna 528 is in communication with both the receiver 524 and the transmitter 522 to facilitate the transmission and reception of wireless data.

Although features and elements are described above in particular combinations, each feature or element can be used alone without the other features and elements or in various combinations with or without other features and elements. The methods or flow charts provided herein may be implemented in a computer program, software, or firmware incorporated in a computer-readable storage medium for execution by a general purpose computer or a processor. Examples of computer-readable storage mediums include a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs).

Suitable processors include, by way of example, a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Arrays (FPGAs) circuits, any other type of integrated circuit (IC), and/or a state machine.

A processor in association with software may be used to implement a radio frequency transceiver for use in a wireless transmit receive unit (WTRU), user equipment (UE), terminal, base station, radio network controller (RNC), or any host computer. The WTRU may be used in conjunction with modules, implemented in hardware and/or software, such as a camera, a video camera module, a videophone, a speakerphone, a vibration device, a speaker, a microphone, a television transceiver, a hands free headset, a keyboard, a Bluetooth® module, a frequency modulated (FM) radio unit, a liquid crystal display (LCD) display unit, an organic light-emitting diode (OLED) display unit, a digital music player, a media player, a video game player module, an Internet browser, and/or any wireless local area network (WLAN) or Ultra Wide Band (UWB) module.

What is claimed is:

1. A method implemented in a wireless transmit/receive unit (WTRU) for performing a handover from a source cell to a target cell, the method comprising:
   initiating reception and processing of a primary broadcast channel (P-BCH) of the target cell after receiving a handover command from an evolved Node B (eNB) associated with the source cell;
   sending a random access preamble to an eNB associated with the target cell, wherein the random access preamble is sent using a contention-based random access channel (RACH) procedure on condition that no dedicated RACH preamble is indicated in the handover command;
   receiving a random access response from the eNB associated with the target cell;
   sending a handover complete message to the eNB associated with the target cell;
   applying a first mode of operation, such that a system frame number (SFN) of the target cell is not required, prior to acquiring the SFN of the target cell; and
   applying a second mode of operation upon acquiring the SFN, wherein the second mode of operation utilizes the SFN of the target cell.

2. The method of claim 1, wherein the random access preamble is sent using a contention-free procedure on condition that a dedicated random access channel (RACH) preamble is indicated in the handover command.

3. The method of claim 1, wherein the reception and processing of the P-BCH is initiated immediately after receiving the handover command.

4. The method of claim 1, wherein the reception and processing of the P-BCH is initiated after sending the handover complete message.

5. The method of claim 1, further comprising: initiating a radio link recovery procedure on condition that the SFN of the target cell is not acquired after a pre-determined period of time.

6. The method of claim 1, wherein applying the first mode of operation comprises disabling discontinuous reception (DRX) operation in the target cell.

7. The method of claim 1, wherein applying the second mode of operation comprises disabling Layer 1 (L1) feedback in the target cell.

8. A wireless transmit/receive unit (WTRU) configured to perform a handover from a source cell to a target cell, the WTRU comprising:
   a transmitter configured to transmit a signal;
   a receiver configured to receive a signal; and
   a processor configured to initiate reception and processing of a primary broadcast channel (P-BCH) of the target cell after receiving a handover command from an evolved Node B (eNB) associated with the source cell, send a random access preamble to an eNB associated with the target cell, receive a random access response from the eNB associated with the target cell, send a handover complete message to the eNB associated with the target cell, apply a first mode of operation, such that a system frame number (SFN) of the target cell is not required, prior to acquiring the SFN of the target cell, and apply a second mode of operation upon acquiring the SFN, wherein the second mode of operation utilizes the SFN of the target cell, wherein the processor is configured to send the random access preamble using a contention-based random access channel (RACH) procedure on condition that no dedicated RACH preamble is indicated in the handover command.

9. The WTRU of claim 8, wherein the processor is configured to send the random access preamble using a contention-free procedure on condition that a dedicated random access channel (RACH) preamble is indicated in the handover command.

10. The WTRU of claim 8, wherein the processor is configured to initiate the reception and processing of the P-BCH immediately after receiving the handover command.

11. The WTRU of claim 8, wherein the processor is configured to initiate the reception and processing of the P-BCH after sending the handover complete message.

12. The WTRU of claim 8, wherein the processor is configured to initiate a radio link recovery procedure on condition that the SFN of the target cell is not acquired after a pre-determined period of time.

13. The WTRU of claim 8, wherein the processor is configured to apply the first mode of operation default configuration by disabling discontinuous reception (DRX) operation in the target cell.

14. The WTRU of claim 8, wherein the processor is configured to apply the first mode of operation by disabling Layer 1 (L1) feedback in the target cell.

15. The method of claim 1, further comprising resetting medium access control (MAC) in response to receiving the handover command.

16. The method of claim 1, wherein applying the first mode of operation comprises disabling semi-persistent scheduling (SPS) in the target cell.

17. The method of claim 1, wherein applying the first mode of operation comprises disabling at least one of discontinuous reception (DRX) operation, Layer 1 (L1) feedback, or semi-persistent scheduling (SPS) in the target cell and applying the second mode of operation comprises enabling at least one of DRX operation, L1 feedback, or SPS in the target cell.

18. The WTRU of claim 8, wherein the processor is further configured to reset medium access control (MAC) in response to receiving the handover command.

19. The WTRU of claim 8, wherein the processor is configured to apply the first mode of operation by disabling semi-persistent scheduling (SPS) in the target cell.

20. The WTRU of claim 8, wherein the processor is configured to apply the first mode of operation by disabling at least one of discontinuous reception (DRX) operation, Layer 1 (L1) feedback, or semi-persistent scheduling (SPS) in the target cell and the processor is configured to apply second mode of operation by enabling at least one of DRX operation, L1 feedback, or SPS in the target cell.

* * * * *

UNITED STATES PATENT AND TRADEMARK OFFICE
CERTIFICATE OF CORRECTION

PATENT NO. : 8,331,326 B2  
APPLICATION NO. : 12/492469  
DATED : December 11, 2012  
INVENTOR(S) : Peter S. Wang et al.

Page 1 of 1

It is certified that error appears in the above-identified patent and that said Letters Patent is hereby corrected as shown below:

In the Claims

Column 10; Lines 4 and 5: delete "default configu-ration"

Signed and Sealed this
Fifteenth Day of March, 2016

Michelle K. Lee
*Director of the United States Patent and Trademark Office*